UNITED STATES PATENT OFFICE.

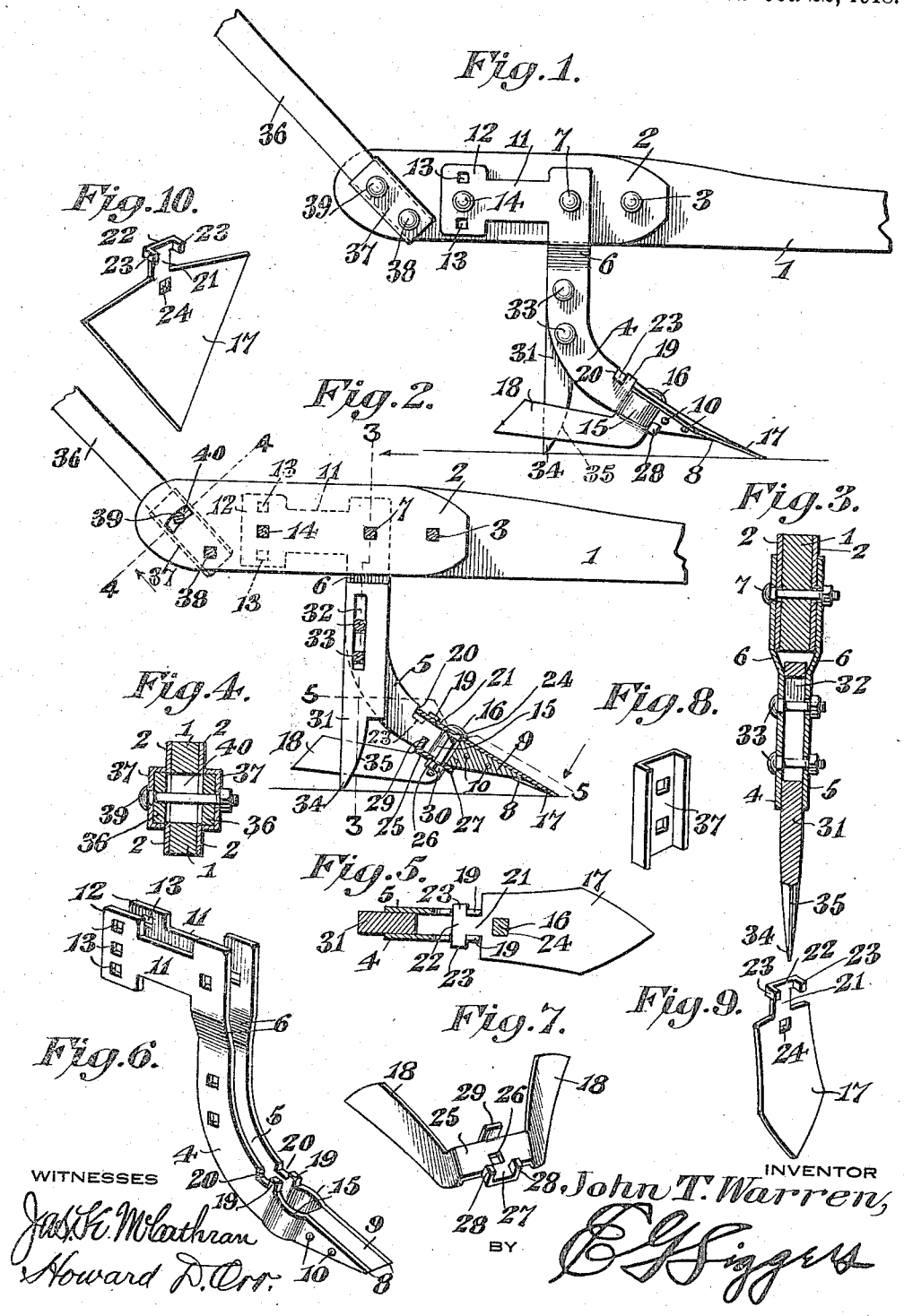

JOHN T. WARREN, OF LUFKIN, TEXAS.

PLOW.

1,282,661.  Specification of Letters Patent.  Patented Oct. 22, 1918.

Application filed March 14, 1918. Serial No. 222,386.

*To all whom it may concern:*

Be it known that I, JOHN T. WARREN, a citizen of the United States, residing at Lufkin, in the county of Angelina and State of Texas, have invented a new and useful Plow, of which the following is a specification.

This invention relates to improvements in plows.

The object is to provide a plow structure of improved strength and durability wherein means are provided for changing or adjusting the angularity of the plow stock, with relation to the plow beam, so as to render the plow point, carried by said stock, capable of plowing the soil deeper or shallower, as desired.

Another object is to provide means, in the form of a colter carried by the plow stock, for preventing the plow point from following a zig-zag path through the soil while plowing, said means being capable of adjustment for causing the same to penetrate the soil at a greater or lesser depth, and being also capable of being swung upwardly and out of contact with the soil, when it is not desired to use the same, or for the purpose of facilitating the application of the plow point or shovel, or for more readily applying the heel sweeps.

A further object is to improve the means for attaching the said point and sweeps, so that the entire strain incident to their usage, will not be brought upon the heel bolt, but will be partially imparted to novel locking means which effectually prevent any loosening of the said point or sweeps.

A still further object is to provide means for adjusting the plow handles to suit the convenience or comfort of the operator, and to so protect and strengthen the movable parts of these adjustable features as to reduce wear and danger of breakage to a minimum.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawing, in which like reference characters designate similar parts throughout the several figures:—

Figure 1 is a side elevation of the improved plow, the handles and beam being only partially shown.

Fig. 2 is a longitudinal sectional view thereof, the beam and colter being shown in elevation.

Fig. 3 is a vertical transverse section, taken on the line 3—3 of Fig. 2.

Fig. 4 is a detail sectional view, taken on the line 4—4 of Fig. 2.

Fig. 5 is a substantially horizontal sectional view, taken on the line 5—5 of Fig. 2.

Fig. 6 is a detail perspective view of the plow stock.

Fig. 7 is a detail perspective view of the heel sweep.

Fig. 8 is a detail perspective view of one of the clamp members for the handles.

Fig. 9 is a detail perspective view of one form of plow point.

Fig. 10 is a similar view of another form of point.

Referring to the drawing, there is illustrated a plow beam 1, which is formed of wood having the necessary strength to withstand the strain to which plow beams are subjected, the rear end of the same being rounded and somewhat enlarged to strengthen the same.

A pair of wear-plates 2—2 are arranged, one at either side of the beam 1 and at the enlarged end thereof, said wear plates following the contour of the beam and being formed of suitable sheet metal, adapted to lie flat against the sides of the beam and to protect the same against wear from certain adjustable parts to be later described. The wear plates 2—2 are securely clamped to the sides of the beam 1 by a series of bolts, one of which is bolt 3, located adjacent to the front ends of the said plates and traverses the plates and beam substantially at their horizontal center lines.

A plow stock comprising a right and left hand member, 4 and 5 respectively, formed of metal and having identical, opposed parts, is adapted to be pivoted, at its upper end, to the plow beam, the said members 4 and 5 being outwardly flared, as indicated at 6, to provide ample space for the beam 1 and plates 2—2 to pass between the same, a bolt 7 passing through appropriate, registering perforations in the members 4 and 5, the plates 2—2 and the beam 1, for the purpose of providing such pivotal connection, said bolt 7 being in horizontal alinement with the bolt 3.

The plow stock members 4 and 5 are curved forwardly at their lower extremities, and brought to a point 8, a filler block 9 formed preferably of metal, being interposed between the ends of the said members 4 and 5 for the purpose of maintaining the same in their required spaced relation. The filler block 9 is preferably secured in position by rivets 10, though bolts or other means may be employed for the purpose.

The plow stock members 4 and 5 are further provided, at their upper ends with rearwardly extending arms 11, which are adapted to lie against the outer faces of the wear plates 2—2, in alinement with the pivotal bolt 7, and are provided with enlarged ends 12, provided with a vertically disposed series of perforations 13, arranged arcuately on a radius struck from the pivot bolt 7. The perforations 13 are in registering relation to suitable perforations in the wear plates and the beam respectively, and which are traversed by a clamp bolt 14, for the purpose of preventing any swinging movement of the plow stock, upon its pivot 7. When the clamp bolt 14 traverses the middle perforation 13, the stock is in substantial vertical position, and when the said stock is shifted so that the bolt 14 may traverse the upper or the lower perforation 13, a corresponding change in the inclination of the pointed end 8 of the stock is effected.

The bolts 3, 7 and 14 are preferably provided with square shanks adjacent to their heads, as is usual in such structures, and the corresponding perforations formed in the wear plates 2 and stock members 4 and 5, for the reception of said bolts, are preferably made square also, so that the bolts may be introduced from either side and the squared portion thereof properly engaged to prevent the bolts from turning, as clearly illustrated in the drawing.

Immediately in rear of the filler block 9, the members 4 and 5 of the plow stock, are oppositely bowed outwardly, as at 15, to provide for the passage of a bolt 16 which secures a plow point or shovel 17 in place upon the stock, and is also used to secure a heel sweep 18 in position beneath and to the rear of the said stock, when it is desired to use the same.

The members 4 and 5 are somewhat reduced upon their upper edges, at their lower or forward ends, to provide shoulders 19, which are located adjacent to the bowed portions 15 thereof, and alined notches 20 are formed in the upper edges of the said members 4 and 5 and in rear of the shoulders 19, for a purpose to be described.

The plow point or shovel 17, which may be of any desired form, is provided at its upper or rear edge with a T-shaped extension 21 of a width substantially equal to the space between the members 4 and 5, and has at its free end, outwardly extending arms 22 terminating in downwardly directed lugs 23. The point 17 is adapted to lie flat upon the reduced upper edges of the members 4 and 5 and the filler block 9, with the upper or rear edges thereof abutting against the shoulder 19, and the extension 21 fitting between the said members 4 and 5. The laterally disposed arms 22 are then seated in the notches 20 and the lugs 23 lie against the outer faces of the members 4 and 5. A suitable, squared aperture 24 is provided in the point 17, in alinement with the space formed by the bowed portions 15 of the stock members, for the reception of the squared shank portion of the bolt 16, which, in conjunction with the interlocking of the arms 22 in the notches 20 and the engagement of the lugs 23 with the members 4 and 5, will rigidly secure the point in position. Should it be desired to use the point 17 alone, a suitable cross bar may be used to bear against the under sides of the members 4 and 5 and having a suitable aperture for the passage of the bolt 16 and against which an appropriate nut may bear.

It is, however, intended to use the point 17 in conjunction with the heel sweep 18, and to this end the sweep is preferably formed with a cross bar or member 25, having a perforation 26 at the center thereof, for the reception of the threaded end of the bolt 16. The cross bar 25 is provided with a forward extension 27, having upon its side edges upstanding lugs 28 adapted to engage the outer faces of the plow stock members 4 and 5 and prevent any lateral twisting or turning of the sweep upon the fastening bolt 16. The cross bar 25 is further provided upon its rear edge with a centrally located, upstanding lug 29 which fits between the said members 4 and 5 and assists the first-mentioned lugs in preventing such movement of the sweep. A nut 30 is threaded on the lower end of the bolt 16, and bears against the under side of the cross bar or member 25 of the sweep and thus the said sweep and the plow point 17 are effectually held against accidental movement by a single bolt.

Between the vertically disposed portions of the plow stock or standard members 4 and 5, there is located a colter 31 in the form of a bar or plate of a thickness substantially equal to the space between the said members. This colter is provided with a vertically disposed slot 32 arranged in its upper portion, in alinement with suitable perforations formed in the plow stock and through which pass bolts 33, which may be tightened to securely clamp the colter in any adjusted position, the slot 32 being of sufficient length to permit of considerable vertical movement of the said colter to project the lower pointed end 34 thereof to penetrate to a greater or lesser degree into the soil. The colter has its front edge cut away and provided with a knife-edge 35 to enable the same to more freely pass through the soil when the plow is in action, during which it will be seen that the said colter will act to prevent any lateral or zig-zag movement of said plow.

The plow handles 36, which as usual are formed of wood, are provided, at their lower ends each with a cuff 37 formed of suitable sheet metal and incasing the outer face and the top and bottom edges of the handles to strengthen the same at the point of fastening to the plow beam 1. At the extreme lower end of the handles, suitable perforations are formed therein and through the cuffs for the reception of a pivotal bolt 38 which may be passed through the handles, from either side, and through a registering perforation in the plow beam, the bolt having its shank portion adjacent to its head squared to fit the handles and to prevent its turning when tightening the nut thereon.

Other similar perforations are formed through the handles and cuffs, near the upper ends of the latter for the like introduction of a clamping bolt 39 which also traverses an arcuate slot 40 formed in the plow beam 1 and the wear plates 2—2, said slot 40 being struck on a curve having the pivotal bolt 38 as a center and thus permitting of considerable up and down movement of the handles to suit the height of the operator.

From the foregoing it will be seen that a simply constructed plow has been provided having great strength and durability, wherein the plow stock having the point and sweeps attached thereto may be adjusted to enter the soil to a greater or lesser degree, by the simple manipulation of a single bolt, and further, that by the removal of a single bolt, the plow point or sweep, or both, may be removed from the stock, for the purpose of replacing the same or for applying some other form of point or sweeps desired.

It will be further seen that a simple means for guiding the plow in its passage through the field, has been provided in the use of the colter, that the latter is readily adjustable upwardly or downwardly and swung out of the way to more readily reach the fastening means for the point and sweep.

It will be noted that in addition to the bolt 3, the wear plates are held in place by the bolts 7, 14, 38 and 39, which also have other functions as previously pointed out.

What is claimed is:—

1. The combination with a plow stock having two spared members forming a plow-seat provided on their upper edges with shoulders, notches in said edges in rear of said shoulders, of a plow point adapted to rest upon said seat and abut against the shoulders and having a perforation registering with the space between the plow stock members, and an integral extension fitting between the members, said extension having outstanding arms traversing the notches and terminating in downwardly directed lugs bearing against the side faces of the stock members, and a bolt passing through the perforation in the point and between the members of the stock and having engagement with the stock for holding the point to its position.

2. The combination with a plow stock comprising two parallel, spaced members curved forwardly at their lower ends and there joined together, of a heel sweep formed of a single piece of metal and comprising diverging blades joined at their forward ends by a cross member, said cross member having a perforation, a forwardly extending portion carried by the cross member, spaced upstanding lugs formed on the sides of the extension and adapted to embrace the sides of the stock members when the cross member of the sweep is applied beneath the stock, an upstanding lug formed on the rear edge of the cross member and adapted to fit between the stock members, and a bolt passing between and engaging the stock members and traversing the perforation in the cross member and having a nut for holding the latter to the plow stock.

3. The combination with a plow stock composed of spaced members curved forwardly at their lower ends and having a plow seat formed on their upper edges to provide shoulders and having registering notches in said edges in rear of the shoulders, of a plow point having a perforation and provided with a central longitudinal extension formed on its upper edge and adapted to fit between the stock members when the plow point is on its seat, said extension having outwardly directed arms fitting within the said notches and terminating in downwardly projected lugs embracing the sides of the stock members, a heel sweep formed integrally with a cross bar adapted to fit against the underside of the plow stock and having, on its front edge, spaced lugs extending upwardly and embracing the members of the said stock, said cross bar having on its rear edge a single upstanding lug fitting between the members of the plow stock and having a central perforation formed therein, and a bolt traversing the perforations in the plow point and the cross member of the sweep and passing between the members of the stock for holding the point and the sweep in position thereon.

4. In combination with a plow beam having a front and a rear perforation formed therein, a plow stock comprising two parallel, spaced members having registering perforations near their upper ends in alinement with the front perforation in the beam, a bolt traversing the same and pivoting the stock to the beam, said members being curved forwardly at their lower ends and having means thereat for the attachment of implements for tilling the soil, rearwardly directed arms carried by the members of the stock and lying normally parallel to and against the sides of the plow beam and terminating in vertically disposed heads having an arcuate series of perforations formed therein on a radius struck from the pivot bolt as a center and located so as to register with the rear perforation of the plow beam, and a clamping bolt traversing a pair of the arcuate series and the said rear perforation for adjusting the plow stock to give more or less inclination to the plow point.

In testimony that I claim the foregoing as my own, I have hereto affixed my signature in the presence of two witnesses.

JOHN T. WARREN.

Witnesses:
C. D. BOYKIN,
DELTON MOREHEAD.

Copies of this patent may be obtained for five cents each, by addressing the "Commissioner of Patents, Washington, D. C."